United States Patent
Zheng et al.

(10) Patent No.: US 12,013,771 B2
(45) Date of Patent: Jun. 18, 2024

(54) METHOD AND INTERCONNECT INTERFACE FOR BUILT-IN SELF-TEST

(71) Applicant: Shanghai Zhaoxin Semiconductor Co., Ltd., Shanghai (CN)

(72) Inventors: Chunhui Zheng, Beijing (CN); Jiao Li, Xi'an (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 188 days.

(21) Appl. No.: 17/721,560

(22) Filed: Apr. 15, 2022

(65) Prior Publication Data

US 2023/0141802 A1 May 11, 2023

(30) Foreign Application Priority Data

Nov. 8, 2021 (CN) .......................... 202111312589.5

(51) Int. Cl.
G06F 11/27 (2006.01)
G06F 13/40 (2006.01)

(52) U.S. Cl.
CPC .......... *G06F 11/27* (2013.01); *G06F 13/4068* (2013.01)

(58) Field of Classification Search
CPC ...... G06F 11/27; G06F 11/273; G06F 11/277; G06F 13/40
See application file for complete search history.

(56) References Cited

U.S. PATENT DOCUMENTS

| | | | | |
|---|---|---|---|---|
| 6,914,637 B1* | 7/2005 | Wolf | ...................... | H04N 19/89 348/476 |
| 7,590,504 B2* | 9/2009 | Chorn | .............. | G01R 31/31912 702/120 |
| 8,468,398 B2* | 6/2013 | Jiang | ................ | G01R 31/31716 714/717 |
| 10,678,634 B2* | 6/2020 | Ellur | ................. | H03K 19/17764 |
| 2001/0054166 A1* | 12/2001 | Fukuda | .............. | G01R 31/2884 714/733 |
| 2003/0149922 A1* | 8/2003 | Lai | .......... | G11C 29/56 714/724 |
| 2009/0304054 A1* | 12/2009 | Tonietto | ............ | H04L 25/03343 375/221 |
| 2010/0229058 A1* | 9/2010 | Goyal | ............ | G01R 31/318558 714/E11.155 |
| 2010/0293423 A1* | 11/2010 | Goyal | ................ | G01R 31/3177 714/E11.155 |
| 2011/0309359 A1* | 12/2011 | Saen | ..................... | G11C 29/025 257/E23.002 |
| 2012/0117436 A1* | 5/2012 | Portolan | ........ | G01R 31/318563 714/738 |

(Continued)

*Primary Examiner* — Kamini B Patel
(74) *Attorney, Agent, or Firm* — McClure, Qualey & Rodack, LLP

(57) ABSTRACT

A method for built-in self-test, including the following operations: at a transmitting part, selecting a gold pattern, generating a test pattern using the gold pattern and a header corresponding to the gold pattern, and transmitting the test pattern to a receiving part via a tested path; and at a receiving part, parsing the header and a received pattern from the test pattern received, obtaining the gold pattern corresponding to the header based on the header parsed, and obtaining a test result of the tested path by comparing the gold pattern to the received pattern.

9 Claims, 7 Drawing Sheets

(56) References Cited

U.S. PATENT DOCUMENTS

| | | | | |
|---|---|---|---|---|
| 2012/0137186 A1* | 5/2012 | Portolan | ........ | G01R 31/318558 |
| | | | | 714/E11.155 |
| 2013/0145212 A1* | 6/2013 | Hsu | .......... | H04L 1/24 |
| | | | | 714/27 |
| 2015/0298672 A1* | 10/2015 | Lee | ........ | B60T 8/171 |
| | | | | 701/29.7 |
| 2019/0227867 A1* | 7/2019 | Ellur | ........ | H03M 13/098 |
| 2019/0295678 A1* | 9/2019 | Anzou | ........ | G11C 29/36 |

\* cited by examiner

METHOD AND INTERCONNECT INTERFACE FOR BUILT-IN SELF-TEST

CROSS REFERENCE TO RELATED APPLICATIONS

This application claims priority of China Patent Application No. 202111312589.5, filed on Nov. 8, 2021, the entirety of which is incorporated by reference herein.

BACKGROUND OF THE INVENTION

Field of the Invention

The present disclosure relates to circuit testing technology, particularly to built-in self-test (BIST) technology.

Description of the Related Art

Integrated circuit (IC) manufacturers may use BIST technology to perform faster and lower-cost IC testing.

With the density required for IC packaging, the design of the interconnect interface between ICs gets more delicate, too.

Therefore, how to perform an easy and efficient test on a packet transmitting path provided by such a delicate interconnect interface has become an essential issue.

BRIEF SUMMARY OF THE INVENTION

The present disclosure provides a built-in self-test (BIST) method, including the following operations: at a transmitting part, selecting a gold pattern, generating a test pattern using the gold pattern and a header corresponding to the gold pattern, and transmitting the test pattern to a receiving part via a tested path; and at the receiving part, parsing the header and a received pattern from the test pattern received, obtaining the gold pattern corresponding to the header based on the header parsed, and obtaining a test result of the tested path by comparing the gold pattern to the received pattern.

In some embodiments, obtaining the test result of the tested path by comparing to gold pattern and the received pattern includes calculating a bit error rate (BER) by comparing the received pattern to the gold pattern.

In some embodiments, generating the test pattern using the gold pattern and the header corresponding to the gold pattern includes generating the test pattern by adding the header at the starting position of the gold pattern.

The present disclosure also provides a built-in self-test (BIST) system, including a first connection interface and a second connection interface coupled to the first connection interface. The first connection interface includes a first pattern generation module and a first pattern comparison module, which are respectively in a first transmitting part and a first receiving part of the first connection interface. The second connection interface includes a second pattern generation module and a second pattern comparison module, which are respectively in a second transmitting part and a second receiving part. At the first transmitting part, the first pattern generation module is configured to select a first gold pattern, and to generate a first test pattern using the first gold pattern and a first header corresponding to the first gold pattern. The first test pattern is transmitted to the second receiving part of the second connection interface via a first tested path. At the second receiving part, the first header and a first received pattern are parsed from the first test pattern received, the second comparison module is configured to obtain the first gold pattern corresponding to the first header based on the first header parsed, and to obtain a first test result of the first tested path by comparing the first gold pattern to the first received pattern.

In some embodiments, at the second transmitting part, the second pattern generation module is configured to select a second gold pattern, and to generate a second test pattern using the second gold pattern and a second header corresponding to the second hold pattern. The second test pattern is transmitted to the first receiving part of the first connection interface via a second tested path. At the first transmitting part, the second header and a second received pattern are parsed from the second test pattern received, the first pattern comparison module is further configured to obtain the second gold pattern corresponding to the second header based on the second header parsed, and to obtain a second test result by comparing the second gold pattern to the second received pattern.

In some embodiments, at the first transmitting part, the first pattern generation module is configured to select a third gold pattern, and to generate a third test pattern using the third gold pattern and a third header corresponding to the third gold pattern. The third test pattern is transmitted to the first receiving part via a third tested path. At the first receiving part, the third header and a third receiving pattern are parsed from the third test pattern received, the first pattern comparison module is configured to obtain the third gold pattern corresponding to the third header based on the third header parsed, and to obtain a third test result of the third tested path by comparing the third gold pattern to the third received pattern.

In some embodiments, the first connection interface is coupled to a first device and the second connection interface is coupled to a second device. The first device and the second device are operable to communicate through the interconnect interface. In some embodiments, the first device and the second device are sockets, dies, or chiplets.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

In each of the following embodiments, the same reference numbers represent identical or similar elements or components.

The present disclosure provides a method and an interconnect interface for performing BIST on the packet transmission path between two devices. First, the interconnect interface described herein is introduced.

Figure 1:
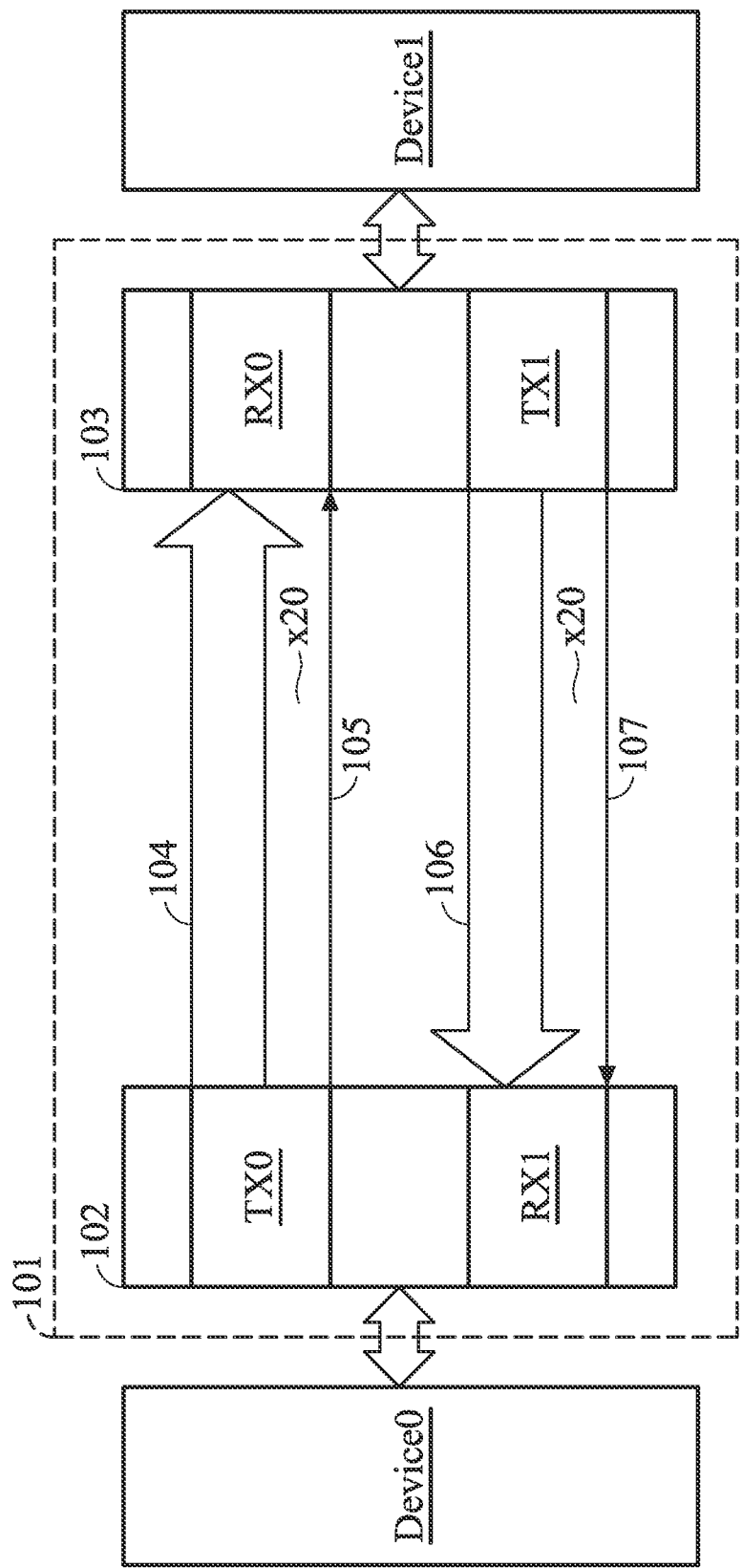
FIG. 1 illustrates the communication architecture of an interconnect interface, according to an embodiment of the present disclosure.

FIG. 1 illustrates the communication architecture of an interconnect interface 101, according to an embodiment of the present disclosure. As shown in FIG. 1, the interconnect interface 101 includes a connection interface 102 and a connection interface 103. The connection interface 102 and the connection interface 103 are respectively coupled to a device Device0 and a device Device1, so as to directly communicate with Device0 and Device1. Although the connection interface 102 is drawn external to Device0 in FIG. 1, and the connection interface 103 is drawn external to Device1, but the present invention is not limited thereto. In some embodiments, the connection interface 102 may be internal to Device0, and the connection interface 103 may be internal to Device1. The connection interface 102 and the connection interface 103 may communicate with each other through physical circuits. As such, the interconnect interface 101 is a full-duplex design and allows the interconnect interface 101 to provide a bi-directional transmission channel between Device0 and Device1.

Specifically, a packet signal 104 and a clock signal 105 are transmitted by the transmitter TX0 of the connection interface 102 and received by the receiver RX0 of the connection interface 103. For the data transmission in the opposite direction, a packet signal 106 and a clock signal 107 are transmitted by the transmitter TX1 of the connection interface 103 and received by the receiver RX1 of the connection interface 102.

During the transmission of packets, issues like noises, interrupts, distortions, bit synchronization, and signal attenuation may result in the difference between the packet transmitted by the transmitting part and the packet received by the receiving part. Such difference is the target to be detected by the built in test(BIST) technology of the present disclosure.

In an embodiment, the devices Device0 and Device1 are two sockets. In another embodiment, the devices Device0 and Device1 are two dies. In yet another embodiment, the devices Device0 and Device1 are two chiplets. The embodiments of the communication between the two sockets, the two dies, or the two chiplets will be described in more details hereinafter.

Figure 2:
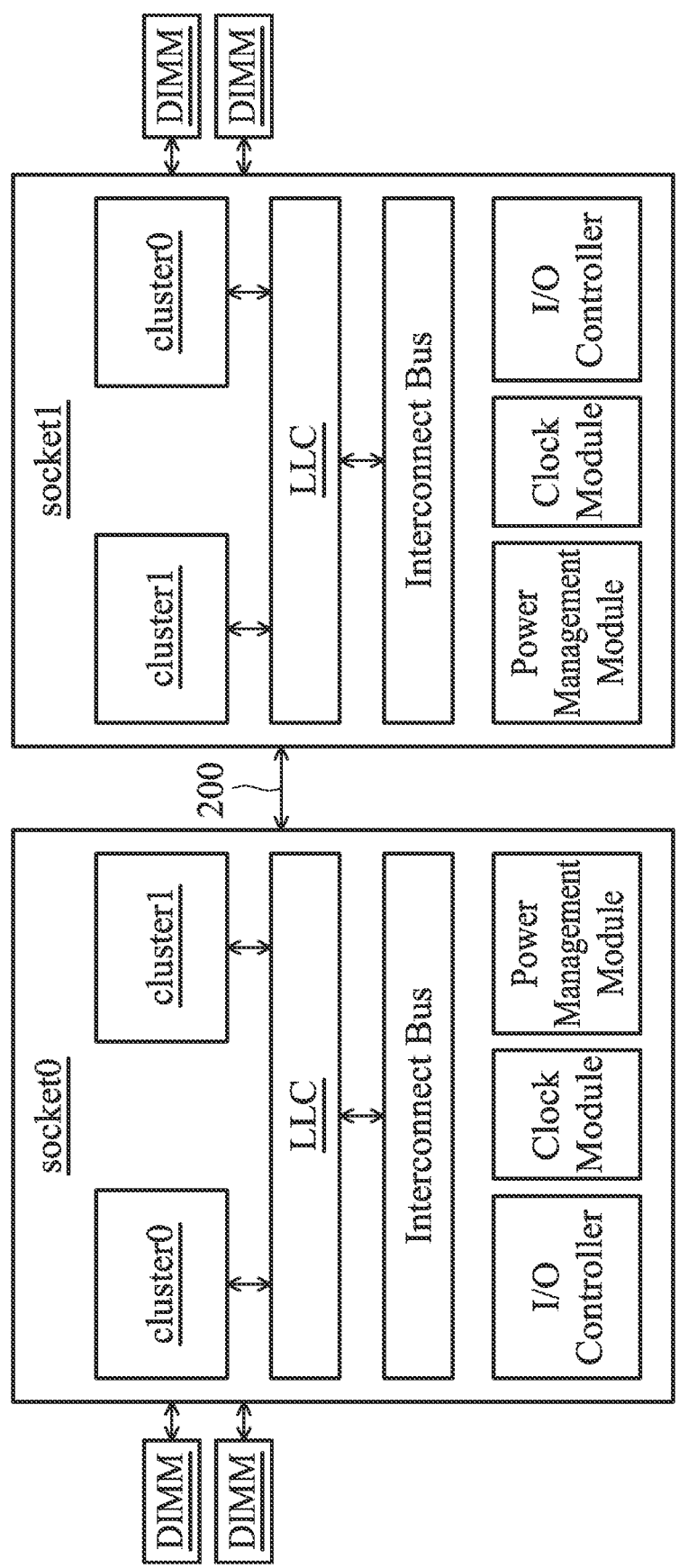
FIG. 2 illustrates the structural diagram of the communication between two sockets through the interconnect interface, according to an embodiment of the present disclosure.

FIG. 2 illustrates the structural diagram of the communication between two sockets through the interconnect interface 200, according to an embodiment of the present disclosure. As shown in FIG. 2, each socket is provided with two clusters, labeled as cluster0 and cluster1 respectively. In other cases, there may be one or more clusters in each socket. Each cluster includes several central processing unit (CPU) cores (not shown in FIG. 2). Each socket may be provided with a last level cache (LLC), an interconnect bus (i.e., the physical circuit of the interconnect interface 200), and other various components (such as an input/output controller, a clock module, a power management module, etc.). Each socket may be connected to dual in-line memory modules (DIMM).

The sockets socket0 and socket1 may communicate with each other by transmitting packets with a specific format through the interconnect interface 200. Thus, the CPU cores in socket0 are accessible to the hardware resources (such as LLC, DIMM, or other storage media) of socket1. Similarly, the CPU cores in socket1 may also access the hardware resources of socket0. As such, the CPU cores of all clusters, and the input/output resources in the system 10 can be dispatched together, and the hardware resources owned by socket0 and socket1 can be shared. For example, any CPU core or input/output device in all the clusters in FIG. 2 can access the memory resources owned by socket0 and socket1. In another example, socket0 and socket1 can maintain the cache coherency between each other by transmitting a packet that maintains cache coherency through the interconnect interface 200.

Figure 3:
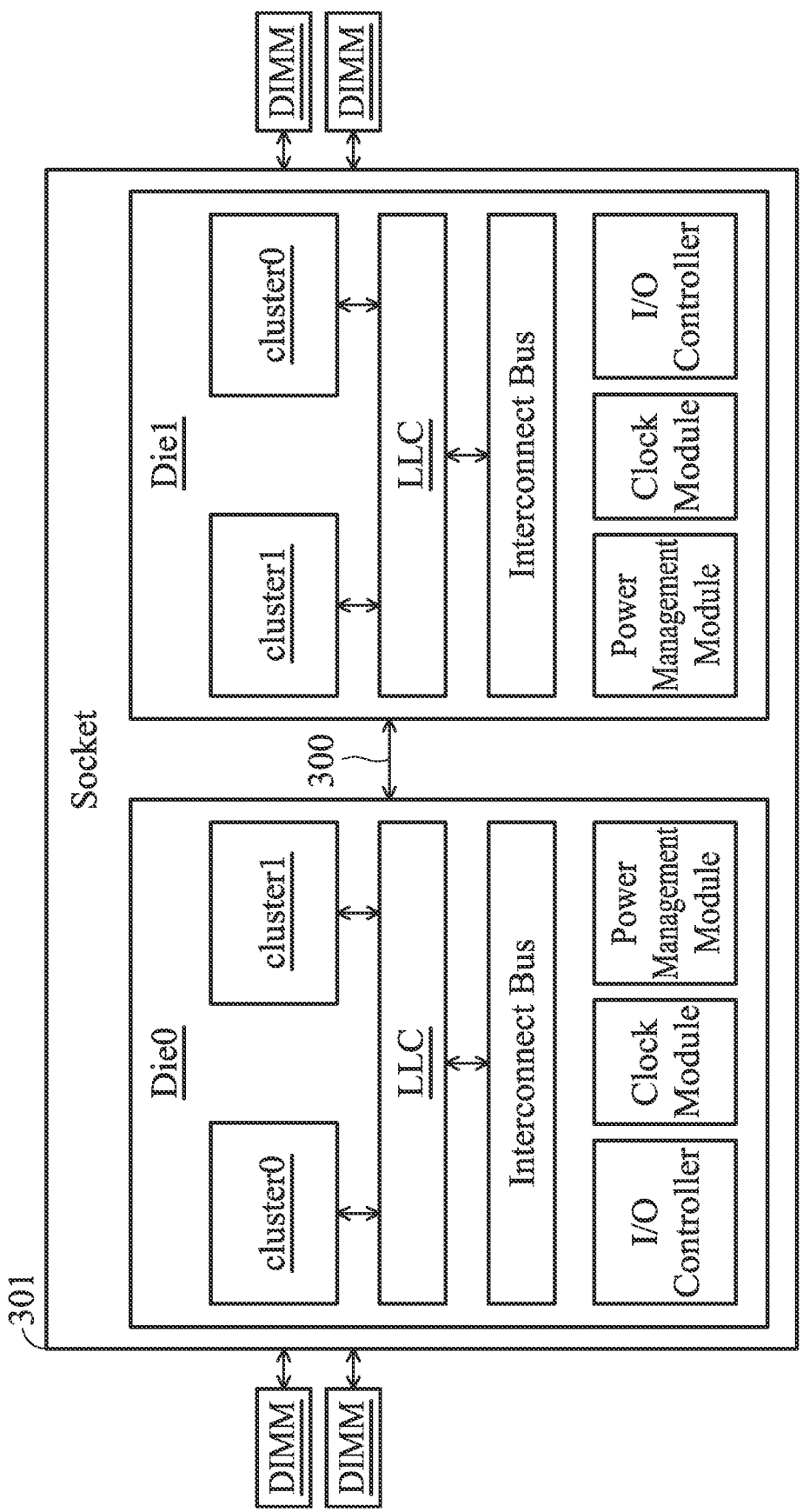
FIG. 3 illustrates the structural diagram of the communication between two dies in a socket through the interconnect interface, according to an embodiment of the present disclosure.

FIG. 3 illustrates the structural diagram of the communication between two dies in a socket through the interconnect interface 300, according to an embodiment of the present disclosure. As shown in FIG. 3, the socket 301 is provided with two dies: Die0 and Die1, and the interconnect interface 300 between the two dies. Die0 and Die1 are interconnected with each other through the ZDI. In other cases, there may be more dies in each socket. In the example of FIG. 3, each socket is provided with two clusters, labeled as cluster0 and cluster1 respectively. In other cases, there may be one or more clusters in each die. Each cluster includes several central processing unit (CPU) cores (not shown in FIG. 3). In addition, each die may be provided with a last level cache (LLC), an interconnect bus (i.e., the physical circuit of the interconnect interface 300), and other various components (such as an input/output controller, a clock module, a power management module, etc.).

In FIG. 3, the dies Die0 and Die1 may communicate with each other by transmitting packets with a specific format through the interconnect interface 300. Thus, the CPU cores in Die0 are accessible to the hardware resources of Die1. Similarly, the CPU cores in Die1 may also access the hardware resources of Die0.

Figure 4:
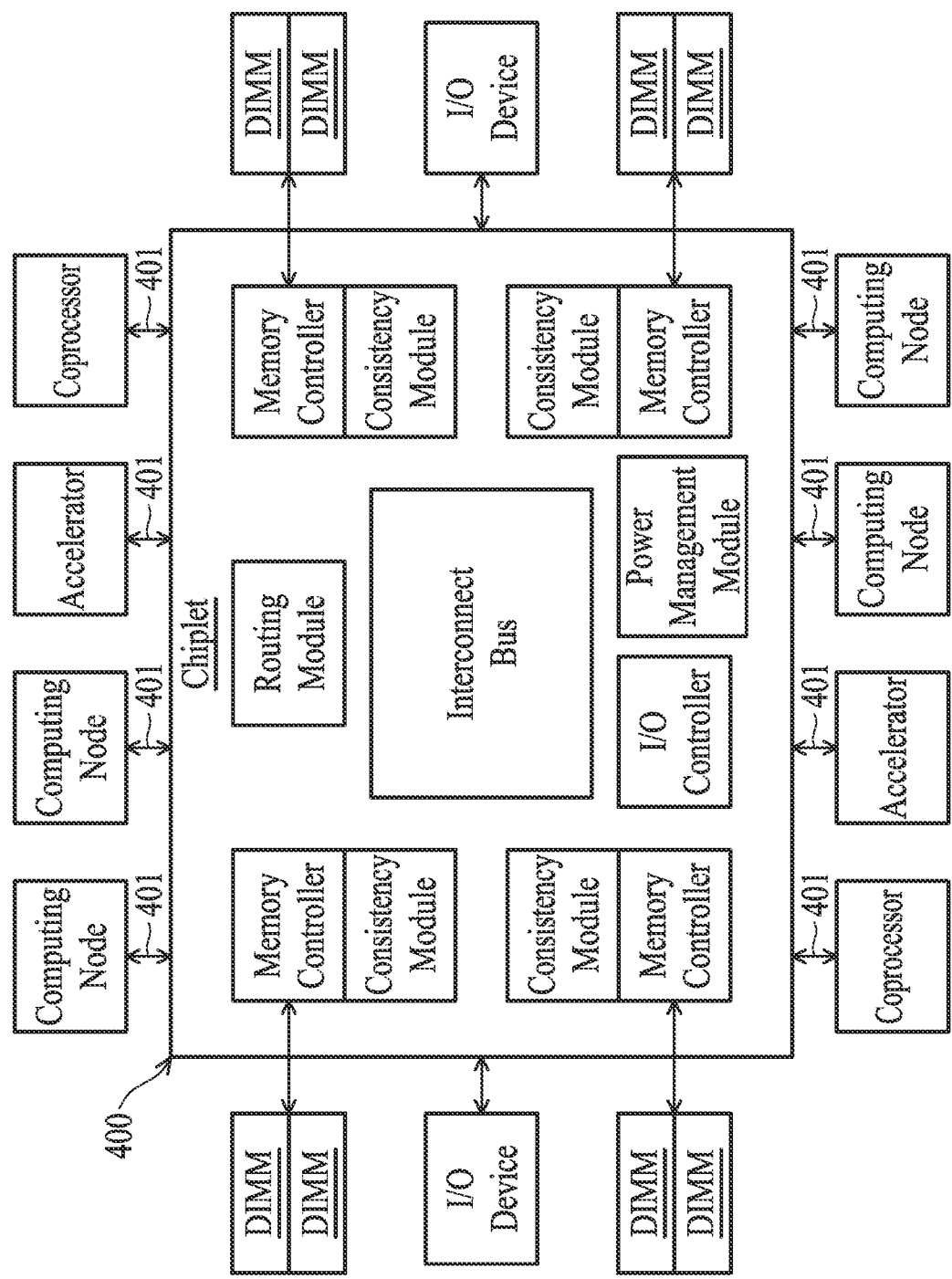
FIG. 4 illustrates the structural diagram of a chiplet, according to an embodiment of the present disclosure.

FIG. 4 illustrates the structural diagram of a chiplet 400, according to an embodiment of the present disclosure. As shown in FIG. 4, the chiplet 400 may be provided with a memory controller, an interconnect bus (i.e., the physical circuit of the interconnect interface 400), and other various components (such as a routing module, a consistency module, an input/output controller, a power management module, etc.). The chiplet 400 may be further connected to dual in-line memory modules (DIMM) and I/O devices. The chiplet 400 may be connected to other chiplets, such as the computing nodes, coprocessors, and accelerators, through the interconnect interface 401.

In order to make up a larger interconnect interface, more numbers of the sockets, dies, and chiplets may be connected through the interconnect interface and form a two-dimensional or three-dimensional interconnect architecture. In an embodiment, a single socket may include a plurality of dies or chiplets.

Figure 5:
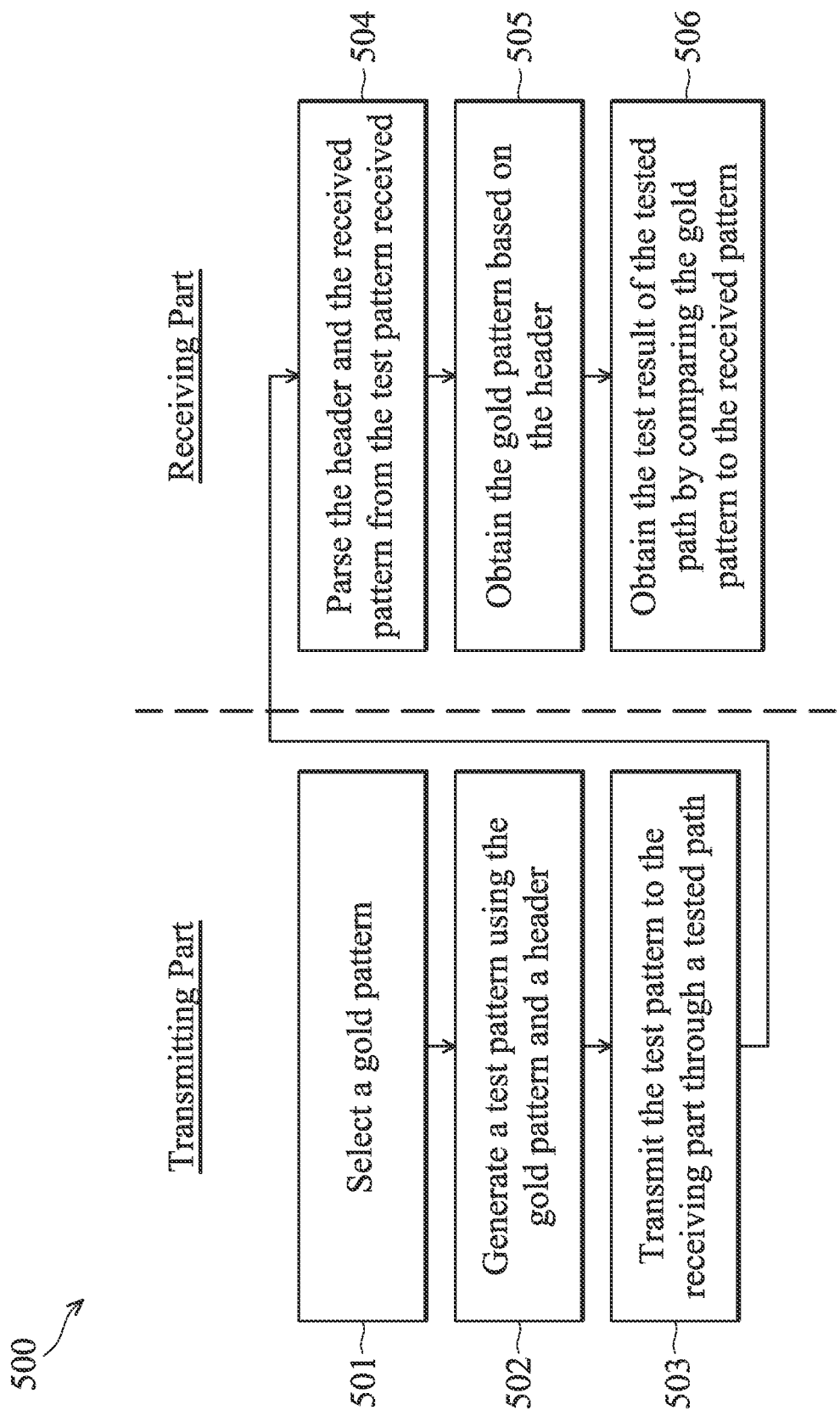
FIG. 5 illustrates the flow diagram of the method for BIST performed in the interconnect interface, according to an embodiment of the present disclosure.

FIG. 5 illustrates the flow diagram of the method 500 for BIST performed in the interconnect interface (e.g., the interconnect interface 200 in FIG. 2, the interconnect interface 300 in FIG. 3, or the interconnect interface 400 in FIG. 4), according to an embodiment of the present disclosure. As shown in FIG. 5, the method 500 includes operations 501-503 executed at the transmitting part, and the operations 504-506 executed at the receiving part.

The method 500 starts in operation 501 executed at the transmitting part. In operation 501, a gold pattern is selected from multiple patterns. Then, the method proceeds to operation 502.

In an embodiment, the patterns described are represented by binary sequences with n bits, the size of n is not limited in the present disclosure. For example, a pattern may be represented by a binary sequence with 10 bits, such as "0101100010" or "0110100101".

The patterns described may be corresponding to a certain hardware configuration or test requirement. That is, in operation 501, the gold pattern is selected according to the hardware configuration or the test requirement. In some embodiments, several modes of the hardware configuration and the test requirement, as well as the pattern corresponding to each mode, may be preset by a microprocessor or a microcontroller. One of the modes may be selected to be the current mode, and then the pattern corresponding to the current mode is obtained and used as the gold pattern.

In operation 502, a test pattern is generated using the gold pattern and a header corresponding to the gold pattern. Then, the method proceeds to operation 503.

In an embodiment, the header described is represented by a binary sequence with m bits. The size of m is not limited by the present disclosure, but typically m may be much smaller than n, n is the number of bits of the gold pattern. For example, the 10-bits gold pattern "0101100010" is corresponding to a 2-bits header "00", and the 10-bits gold pattern "0110100101" is corresponding to a 2-bits header "01". In some embodiments, the header and the gold pattern are both corresponding to the mode of the hardware configuration or test requirement preset by the microprocessor or the microcontroller.

In an embodiment, the test pattern is generated by adding the header at the starting position of the gold pattern. For example, if the gold pattern is "0101100010" and the corresponding header is "00", then the "00" is added at the starting position of "0101100010", so the test pattern generated is "000101100010". If the gold pattern is "0110100101" and the corresponding header is "01", then the "01" is added at the starting position of "0110100101", so the test pattern generated is "010110100101".

In operation 503, the test pattern is transmitted to a receiving part through a tested path. Then, the method proceeds to operation 504.

In an embodiment, the tested path described may be a physical circuit between the transmitting part and the receiving part, such as the electrical physical layer of the interconnect interface described, but the present invention is not limited thereto.

In operation 504, at the receiving part, the header and a received pattern are parsed from the test pattern received. Then, the method proceeds to operation 505.

In normal cases, the test pattern received by the receiving part will be identical to the test pattern transmitted by the transmitting part, so the received pattern parsed in operation 504 will also be identical to the gold pattern used by the transmitting part to generate the test pattern. However, during the transmission from the transmitting part to the receiving part via the tested path, issues like noises, interrupts, distortions, bit synchronization, and signal attenuation may result in the difference between the packet transmitted by the transmitting part and the packet received by the receiving part. Therefore, in abnormal cases, the received pattern parsed from the test pattern received in operation 504 may be different with the gold pattern used by the transmitting part when generating the test pattern.

For example, in normal cases, the test pattern transmitted in operation 504 is "000101100010"m the test pattern received in operation 504 will also be "000101100010", and the header and the received pattern will respectively be "00" and "0101100010". In some abnormal cases, however, the test pattern received in operation 504 may be "000100101010", which is different with "000101100010". The header and the received pattern parsed are then "00" and "0100101010" respectively. The received pattern is also different with the gold pattern.

In some embodiments, the header may be set in a particular data format, so as to reduce the probability of occurring errors in the header during transmission. For example, the header may be set as "000111", which is in a data format having consecutive 0s and consecutive 1s, and the probability of probability of occurring errors will be much smaller than "010101", which is in a data format with alternative 0s and 1s. In some embodiments, a header with a small number of errors is allowed to be recognized as the correct header. In other preferred embodiments, other methods for checking and correcting transmitted data may be adopted, so as to ensure that at least the header parsed by the receiving part is reliable.

In operation 505, the gold pattern is obtained based on the header according to the correspondence between the header and the gold pattern. Then, the method proceeds to operation 506.

For the example discussed previously, the gold pattern "0101100010" is corresponding to the header "00", and the gold pattern "0110100101" is corresponding to the header "01". Therefore, if the header parsed in operation 504 is "00", then the gold pattern obtained in operation 505 may be "0101100010". If the header parsed in operation 504 is "01", then the gold pattern obtained in operation 505 may be "0110100101".

In operation 506, the test result of the tested path is obtained by comparing the gold pattern to the received pattern. The method 500 is complete.

In an embodiment, the test result is the bit error ratio (BER) obtained based on the comparison between the gold pattern and the received pattern. The calculation for BER is to divide the number of different bits between the gold pattern and the received pattern by the total number of bits of the gold pattern and the received pattern. For example, if the gold pattern is a 10-bits sequence "0101100010" and the received pattern is "0100101010", there are 2 different bits between the two patterns (the $4^{th}$ bit and the $7^{th}$ bit), thus the BER is 2/10=20%. For another example, if the gold pattern is a 10-bits sequence "0101100010" and the received pattern is "0011110010", there are 3 different bits between the two patterns (the $2^{nd}$ bit, the $3^{rd}$ bit, and the $6^{th}$ bit), thus the BER is 3/10=30%.

Figure 6:
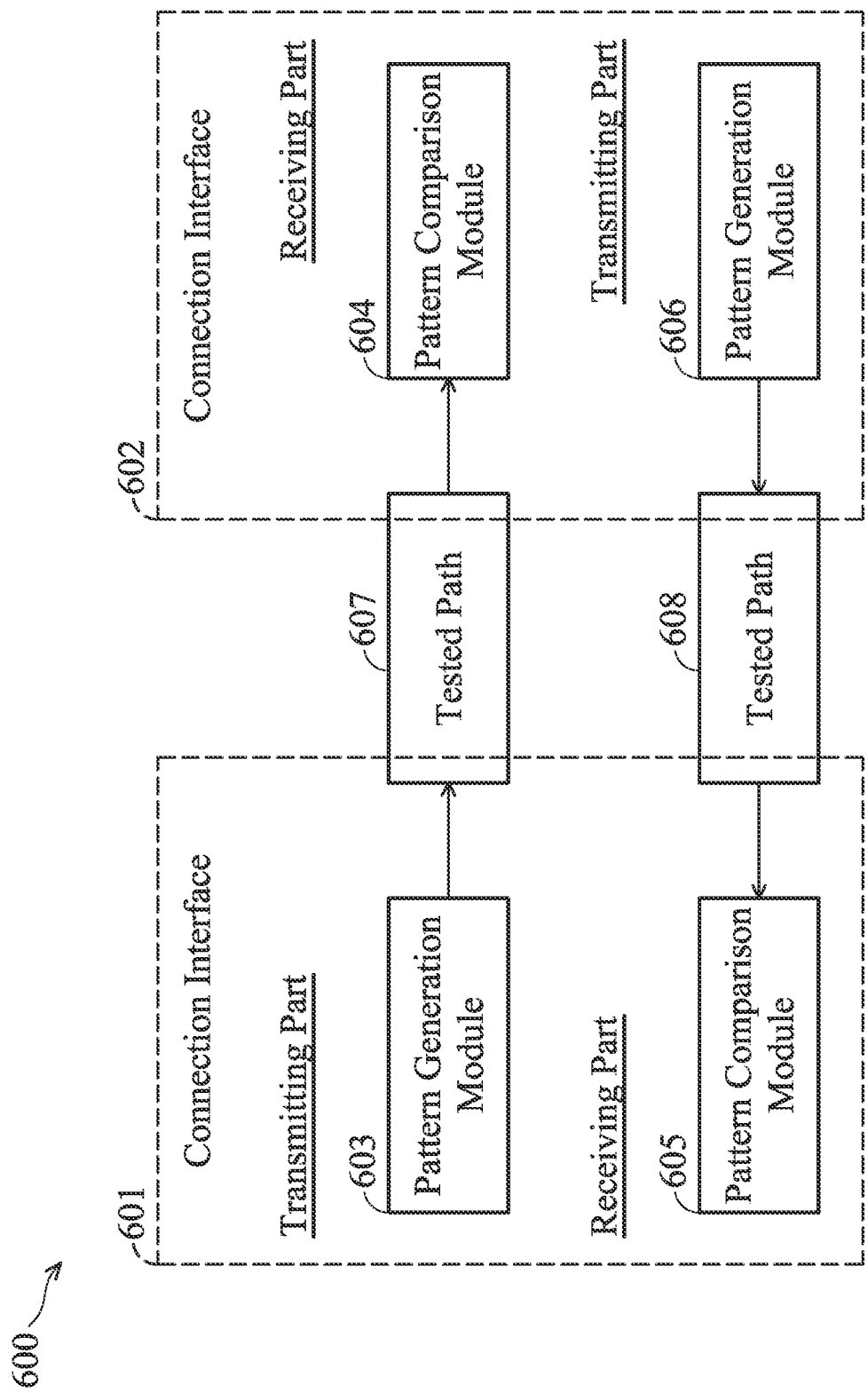
FIG. 6 illustrates the schematic diagram of an exemplary interconnect interface and the test pattern transmission thereof, according to an embodiment of the present disclosure.

FIG. 6 illustrates the schematic diagram of an exemplary interconnect interface 600 and the test pattern transmission thereof, according to an embodiment of the present disclosure. As shown in FIG. 6, the interconnect interface 600 includes a connection interface 601 and a connection interface 602. The connection interface 601 includes a pattern generation module 603 and a pattern comparison module 605, which are respectively at the transmitting part and the receiving part of the connection interface 601. Similarly, the connection interface 602 includes a pattern generation module 606 and a pattern comparison module 604, which are respectively at the transmitting part and the receiving part of the connection interface 602. The connection interface 601 and the connection interface 602 are coupled with each other through the tested path 607 and the tested path 608. The tested path 607 and the tested path 608 may be two physical circuits that are physically different, and may also be physical circuits that are physically the same but having different directions for signal transmission. Furthermore, the present invention is not limited to the aspect that the connection interface 601 or the connection interface 602 must include the entire tested path 607 or the entire tested path 608. In an embodiment, the connection interface 601 and the connection interface 602 may each include a part of the tested path 607 and a part of the tested path 608, which are the electrical physical layer of the connection interface. The other part of the tested path 607 and the other part of the tested path 608 may be other components that are externally connected to the connection interface and constituting the physical circuit.

The interconnect interface 600 is configured to execute the method for BIST described previously. In an embodiment, the pattern generation module 603 and the pattern generation module 606 at the transmitting part executes the operations 501-503 in the method 500, and the pattern comparison module 604 and the pattern comparison module 605 at the receiving part executes the operations 504-506 in the method 500. In some embodiments, the gold pattern selected in operation 501 is preset by other components of the interconnect interface 600, such as a microprocessor or a microcontroller (not shown in FIG. 6).

In general, the tested pattern generated by the pattern generation module 603 at the transmitting part of the connection interface 601 is transmitted to the receiving part of the connection interface 602 via the tested path 607, and the pattern comparison module 604 at the receiving part of the connection interface 602 generates the test result of the tested path 607 based on the test pattern received. For the opposite direction, the tested pattern generated by the pattern generation module 606 at the transmitting part of the connection interface 602 is transmitted to the receiving part of the connection interface 601 via the tested path 608, and the pattern comparison module 605 at the receiving part of the connection interface 601 generates the test result of the tested path 608 based on the test pattern received. In some embodiments, the described operations for testing the tested path 607 and the tested path 608 may be executed simultaneously.

Similar to the communication architecture illustrated by FIG. 1, the connection interface 601 and the connection interface 602 may be respectively coupled to the first device and the second device (not shown in FIG. 6), so as to directly communicate with the first device and the second device. The first device and the second device are operable to communicate with each other through the interconnect interface 600. The first device and the second device may be the sockets, the dies, or the chiplets described previously.

Figure 7:
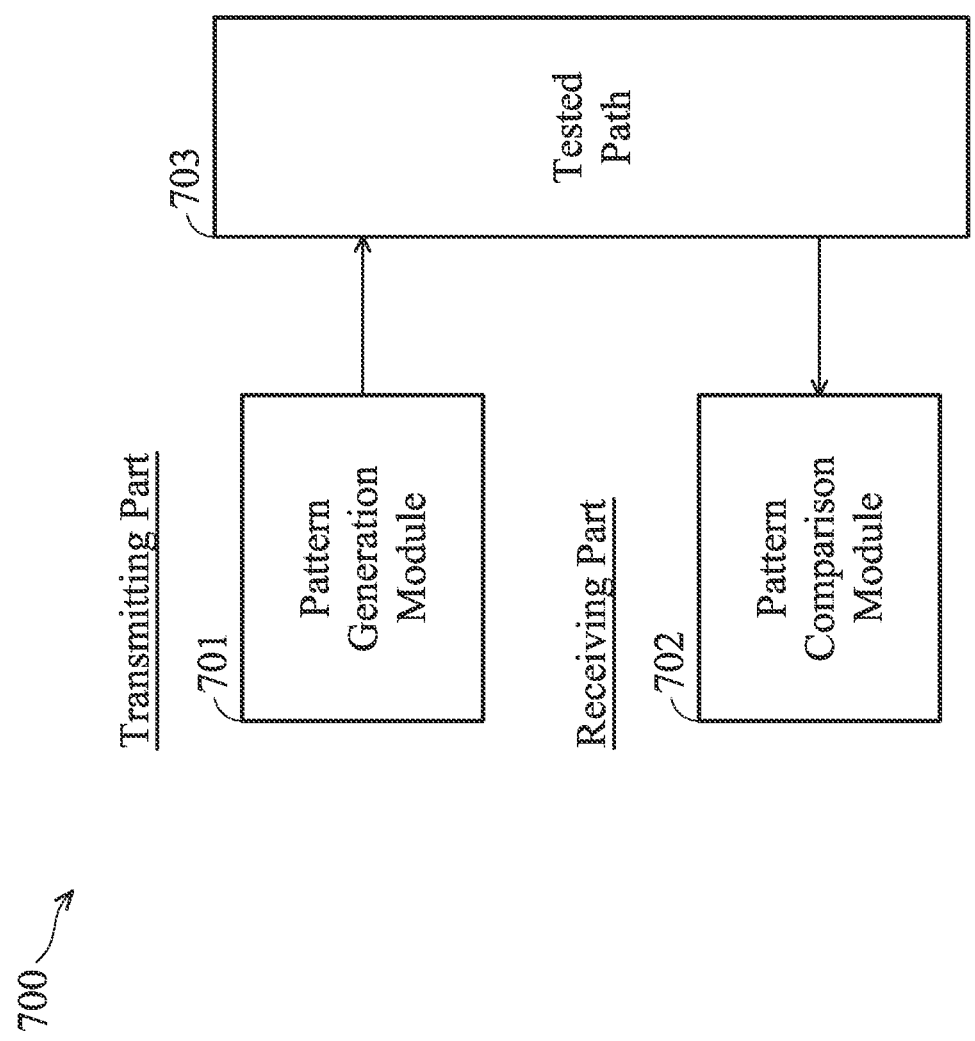
FIG. 7 illustrates the schematic diagram of an exemplary connection interface and the test pattern transmission thereof, according to an embodiment of the present disclosure.

FIG. 7 illustrates the schematic diagram of an exemplary connection interface 700 and the test pattern transmission thereof, according to an embodiment of the present disclosure. As shown in FIG. 7, the connection interface 700 includes a pattern generation module 701 and a pattern comparison module 702, which are respectively at the transmitting part and the receiving part of the connection interface 700. Although the tested path 703 is drawn internal to the connection interface 700 in FIG. 7, the present invention is not limited to the aspect that the connection interface must include part of or all of the tested path 703. In an embodiment, the tested path 703 may be the electrical physical layer of the connection interface 700. In other embodiments, part of or all of the tested path 703 may be other components that are externally connected to the connection interface and constituting the physical circuit.

The connection interface 700 may be equivalent to the connection interface 601 or the connection interface 602 in FIG. 6. If the connection interface 700 is equivalent to the connection interface 601, then the pattern generation module 701 is equivalent to the pattern generation module 603, and the pattern comparison module 702 is equivalent to the pattern comparison module 605. If the connection interface 700 is equivalent to the connection interface 602, then the pattern generation module 701 is equivalent to the pattern generation module 606, and the pattern comparison module 702 is equivalent to the pattern comparison module 604. Furthermore, the connection interface 700 may be coupled to the sockets the dies, or the chiplets described previously.

The connection interface 700 is configured to execute the method 500 for BIST described previously. In an embodiment, the pattern generation module 701 at the transmitting part executes the operations 501-503 in the method 500, and the pattern comparison module 702 at the receiving part executes the operations 504-506 in the method 500. In some embodiments, the gold pattern selected in operation 501 is preset by other components of the interconnect interface 700, such as a microprocessor or a microcontroller (not shown in FIG. 7).

In FIG. 6, the transmitting part that transmits the test pattern and the receiving part that receives the test pattern are in different connection interfaces (i.e., the connection interface 601 and the connection interface 602) in the interconnect interface 600. In contrast, in FIG. 7, the transmission and the receiving of the tested pattern occurs in the same connection interface (i.e., the connection interface 700). In an embodiment, the connection interface 700 may further include a switch (not shown in FIG. 7) to switch between the test in the same connection interface and the test across connection interfaces.

The BIST technology of the present disclosure provides an easy and efficient solution for testing the packet transmission path of the delicate connection interface between ICs.

Ordinal terms used in the claims, such as "first," "second," "third," etc., are used to modify the elements appearing in the claims, and do not imply any prioritization, precedence relation, or a component is higher than the other component, or the chronological order in which the method steps are performed. The intention is to make a distinction between elements with the same name.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for built-in self-test, including:
   at a transmitting part, selecting a gold pattern, generating a test pattern using the gold pattern and a header corresponding to the gold pattern, and transmitting the test pattern to a receiving part via a tested path; and
   at the receiving part, parsing the header and a received pattern from the test pattern received, obtaining the gold pattern based on the header parsed according to the correspondence between the header and the gold pattern, and obtaining a test result of the tested path by comparing the gold pattern to the received pattern.

2. The method as claimed in claim 1, wherein obtaining the test result of the tested path by comparing the gold pattern to the received pattern comprises:
   calculating a bit error rate by comparing the received pattern to the gold pattern.

3. The method as claimed in claim 1, wherein generating the test pattern using the gold pattern and the header corresponding to the gold pattern comprises:
   generating the test pattern by adding the header at a starting position of the gold pattern.

4. An interconnect interface for built-in self-test, comprising:
   a first connection interface, comprising a first pattern generation module and a first pattern comparison module, which are respectively in a first transmitting part and a first receiving part of the first connection interface;
   a second connection interface, coupled to the first connection interface, comprising a second pattern generation module and a second pattern comparison module, which are respectively in a second transmitting part and a second receiving part;
   wherein at the first transmitting part, the first pattern generation module is configured to select a first gold pattern, and to generate a first test pattern using the first gold pattern and a first header corresponding to the first gold pattern, wherein the first test pattern is transmitted to the second receiving part of the second connection interface via a first tested path; and
   wherein at the second receiving part, the first header and a first received pattern are parsed from the first test pattern received, and the second pattern comparison module is configured to obtain the first gold pattern based on the first header parsed according to the correspondence between the first header and the first gold pattern, and to obtain a first test result of the first tested path by comparing the first gold pattern to the first received pattern;
   wherein the first connection interface is coupled to a first device and the second connection interface is coupled to a second device; and
   wherein the first device and the second device are operable to communicate through the interconnect interface.

5. The interconnect interface as claimed in claim 4, wherein at the second transmitting part, the second pattern generation module is configured to select a second gold pattern, and to generate a second test pattern using the second gold pattern and a second header corresponding to the second gold pattern, wherein the second test pattern is transmitted to the first receiving part of the first connection interface via a second tested path; and
   at the first transmitting part, the second header and a second received pattern are parsed from the second test pattern received, and the first pattern comparison module is further configured to obtain the second gold pattern based on the second header parsed according to the correspondence between the second header and the second gold pattern, and to obtain a second test result by comparing the second gold pattern to the second received pattern.

6. The interconnect interface as claimed in claim 4, wherein at the first transmitting part, the first pattern generation module is configured to select a third gold pattern, and to generate a third test pattern using the third gold pattern and a third header corresponding to the third gold pattern, wherein the third test pattern is transmitted to the first receiving part via a third tested path; and
   at the first receiving part, the third header and a third receiving pattern are parsed from the third test pattern received, and the first pattern comparison module is configured to obtain the third gold pattern based on the third header parsed according to the correspondence between the third header and the third gold pattern, and to obtain a third test result of the third tested path by comparing the third gold pattern to the third received pattern.

7. The interconnect interface as claimed in claim 4, wherein the first device and the second device are selected from a group consisting of sockets, dies, or chiplets.

8. The interconnect interface as claimed in claim 4, wherein the first pattern comparison module is further configured to obtain the first test result of the first tested path by comparing the first received pattern to the first gold pattern and calculating a bit error rate.

9. The interconnect interface as claimed in claim 4, wherein the first pattern generation module is further configured to generate the first test pattern by adding the first header at a starting position of the first gold pattern.

* * * * *